US009507069B2

(12) United States Patent
Gupta

(10) Patent No.: US 9,507,069 B2
(45) Date of Patent: Nov. 29, 2016

(54) POLARIZATION HYPERSPECTRAL/MULTISPECTRAL IMAGER AND METHOD

(71) Applicant: U.S. Army Research Laboratory, Washington, DC (US)

(72) Inventor: Neelam Gupta, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/578,043

(22) Filed: Dec. 19, 2014

(65) Prior Publication Data
US 2016/0178823 A1 Jun. 23, 2016

(51) Int. Cl.
G02B 5/30 (2006.01)
(52) U.S. Cl.
CPC .................. *G02B 5/3083* (2013.01)
(58) Field of Classification Search
CPC ...... G02B 5/3083; G02B 5/32; G02B 26/10; G02B 27/286; G02B 27/288
USPC .......................... 359/226.2, 489.07
See application file for complete search history.

(56) References Cited

U.S. PATENT DOCUMENTS

| | | | | | |
|---|---|---|---|---|---|
| 3,060,808 | A | * | 10/1962 | Koester | G02B 5/3083 359/371 |
| 4,772,104 | A | * | 9/1988 | Buhrer | G02B 27/288 359/489.07 |
| 5,120,961 | A | | 6/1992 | Levin et al. | |
| 5,929,946 | A | * | 7/1999 | Sharp | G02B 5/3083 348/E5.133 |
| 6,353,477 | B1 | * | 3/2002 | Johs | G01J 3/447 356/369 |
| 7,196,847 | B2 | * | 3/2007 | Ye | G02B 27/286 359/484.06 |
| 7,535,617 | B2 | | 5/2009 | Gupta | |

(Continued)

FOREIGN PATENT DOCUMENTS

| | | |
|---|---|---|
| EP | 0843392 A2 | 5/1998 |
| EP | 2661652 A1 | 11/2013 |

OTHER PUBLICATIONS

Wachman, E., "AOTF microscope for imaging with increased speed and spectral versatility," Biophysical Journal, vol. 73, Sep. 1997, pp. 1215-1222.

(Continued)

Primary Examiner — Frank Font
(74) Attorney, Agent, or Firm — Lawrence E. Anderson

(57) ABSTRACT

A system for obtaining spectral images from polarized light comprising a polarization sensitive filter; the polarization sensitive filter being configured to receive light at at least one predetermined polarization orientation; and an achromatic waveplate operatively associated with the polarization sensitive filter; the achromatic waveplate being rotatable; whereby rotation of the achromatic waveplate enables light to enter the polarization sensitive spectral filter at at least two predetermined polarization orientations. A method comprising providing a polarization sensitive filter; the polarization sensitive filter being configured to receive light at at least one predetermined polarization orientation; providing an achromatic waveplate operatively associated with the polarization sensitive filter; the achromatic waveplate being rotatable; whereby rotation of the achromatic waveplate enables light to enter the polarization sensitive spectral filter at the at least two predetermined polarization orientations.

20 Claims, 16 Drawing Sheets

(56) References Cited

U.S. PATENT DOCUMENTS

| | | | | |
|---|---|---|---|---|
| 2009/0091758 | A1* | 4/2009 | Johs | G02B 5/3083 356/369 |
| 2010/0296059 | A1* | 11/2010 | Sharp | G02B 26/00 353/8 |
| 2013/0329270 | A1 | 12/2013 | Nielsen et al. | |
| 2008/0144177 | A1* | 6/2008 | Miller | G01J 3/02 359/489.07 |

OTHER PUBLICATIONS

Treado, P., et al., "Near-Infrared Acousto-optic Filtered Spectroscopic Microscopy: A Solid-State Approach to Chemical Imaging," Applied Spectroscopy, vol. 46, No. 4, 1992, pp. 553-559.

Gruneisen, M. "Wavelength-agile telescope system with diffractive wavefront control and acousto-optic spectral filter," Optical Engineering 44(10), 103202-(1-5) Oct. 2005.

Deslis, A., et al. "Optical Design of an Imaging Spectrometer Utilizing an Acousto-Optic Tunable Filter as a Disperser," Jet Propulsion Laboratory,California Institute of Technology Pasadena, CA 9 1009, 98-0890.pdf, http://hdl.handle.net/2014/19482, JPL TRS 1992+ Date issued: Jun. 8, 1998.

Zhang, "Acousto-Optic Tunable Filters Spectrally Modulate Light," www.brimrose.com/pdfandwordfiles/tunable_filter.pdf estimated date Dec. 2, 2011.

Gupta, N., "Spectropolarinnetric Imaging of Laser-induced Fluoresecence," IEEE Sensors Journal, col. 10., No. 3, p. 503-510 (2010).

Gupta, N., et al. "Acousto-optic tunable filter based visible-to near-infrared spectropolarimetric imager," Opt. Eng. 41, 1033-1038 (2002).

Gupta, N., et al., "Object detection with a field-portable spectropolarimetric imager," Appl. Opt. 40, 6626-6632 (2001).

Gupta, N. et al., "AOTF imaging spectrometer with full Stokes polarimetric capability," Appl. Opt. 46, 2632-2037 (2007).

Peinado, A.,et al., "Optimization and performance criteria of a Stokes polarimeter based on two variable retarders," Opt. Express 18, 9815-9830 (2010).

5. Gupta, N., "Development of Spectropolarimetric Imagers from 400 to 1700 nm," Proc. SPIE. 9099, Polarization: Measurement, Analysis, and Remote Sensing XI, 90990N. (May 21, 2014) doi: 10.1117/12.2052947.

United States Statutory Invention Registration, Reg. No. H822, Nettleton, et al., "Methods of Amplitude Modulating a Laser Beam," Sep. 4, 1990.

* cited by examiner

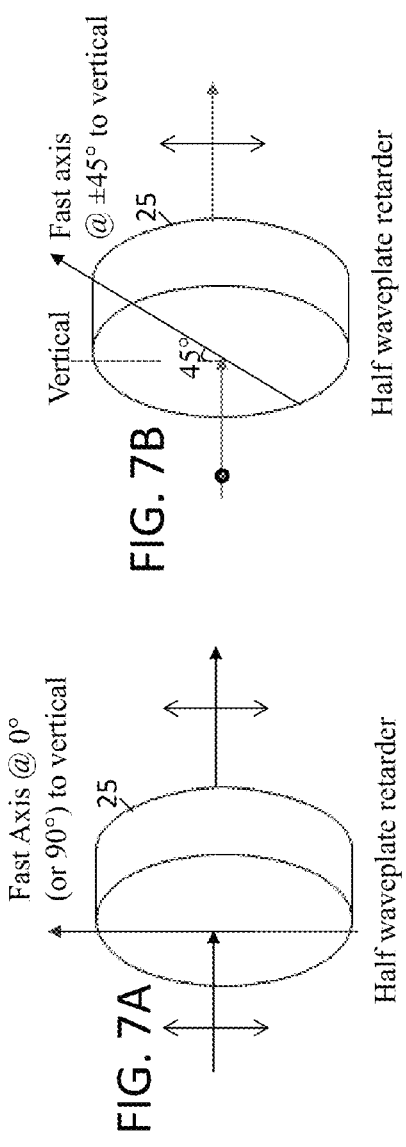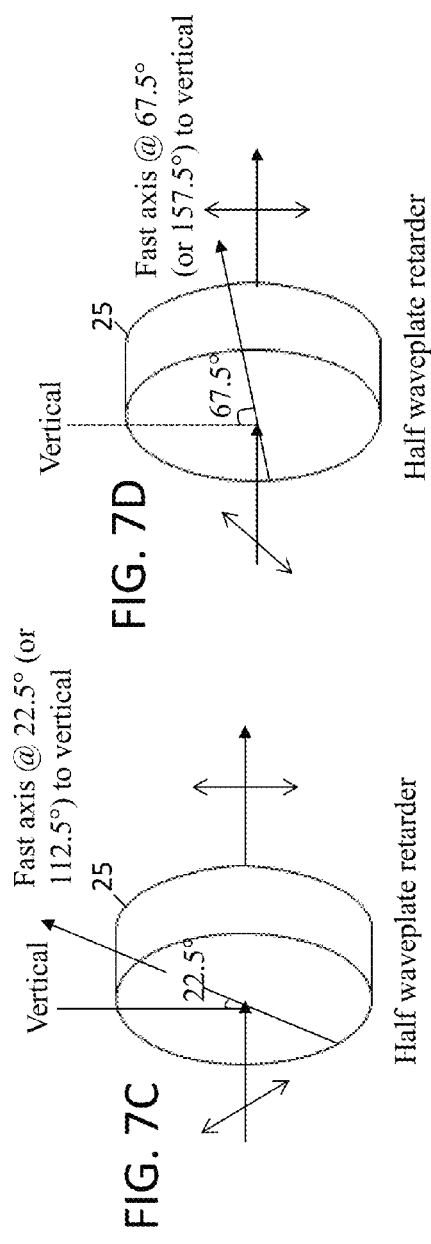

FIG. 7A: Fast axis makes 0° angle with vertical. For incident vertical polarization, transmitted polarization is vertical.
FIG. 7B: Fast axis at 45° to vertical. For incident horizontal polarization (shown by ⊙), transmitted polarization is vertical.
FIG 7C: Fast axis at 22.5° angle with vertical. For incident 135° polarization of light, transmitted polarization is vertical.
FIG. 7D: Fast axis at 67.5° angle with vertical. For incident 45° polarization of light, transmitted polarization is vertical.

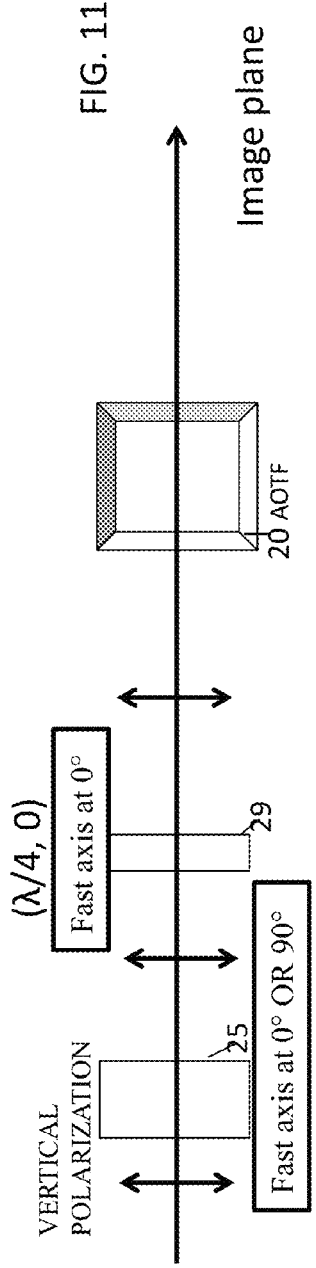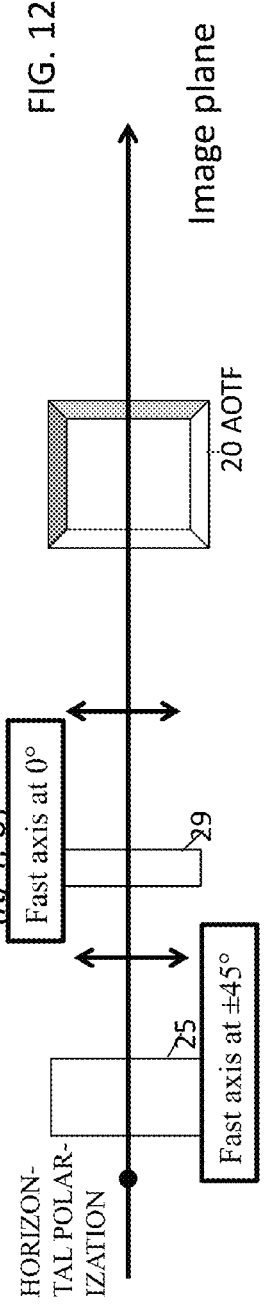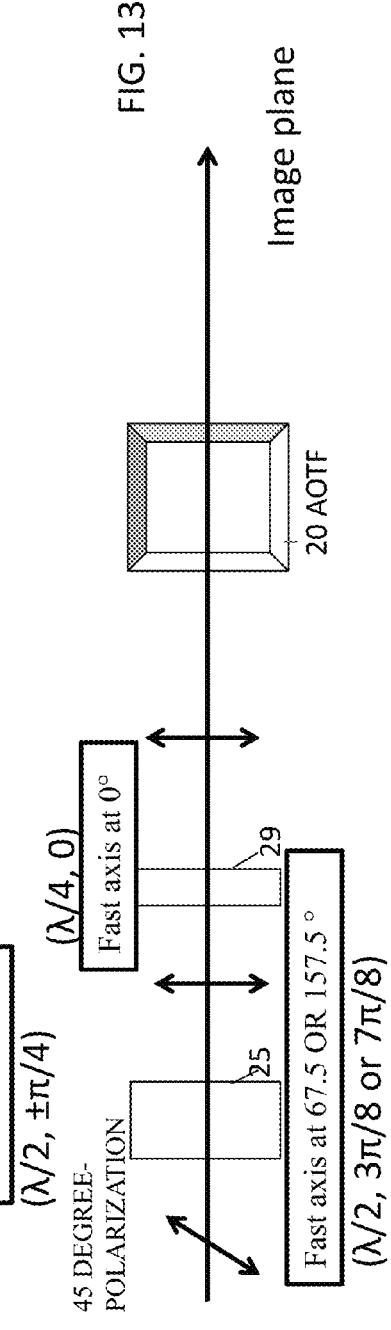

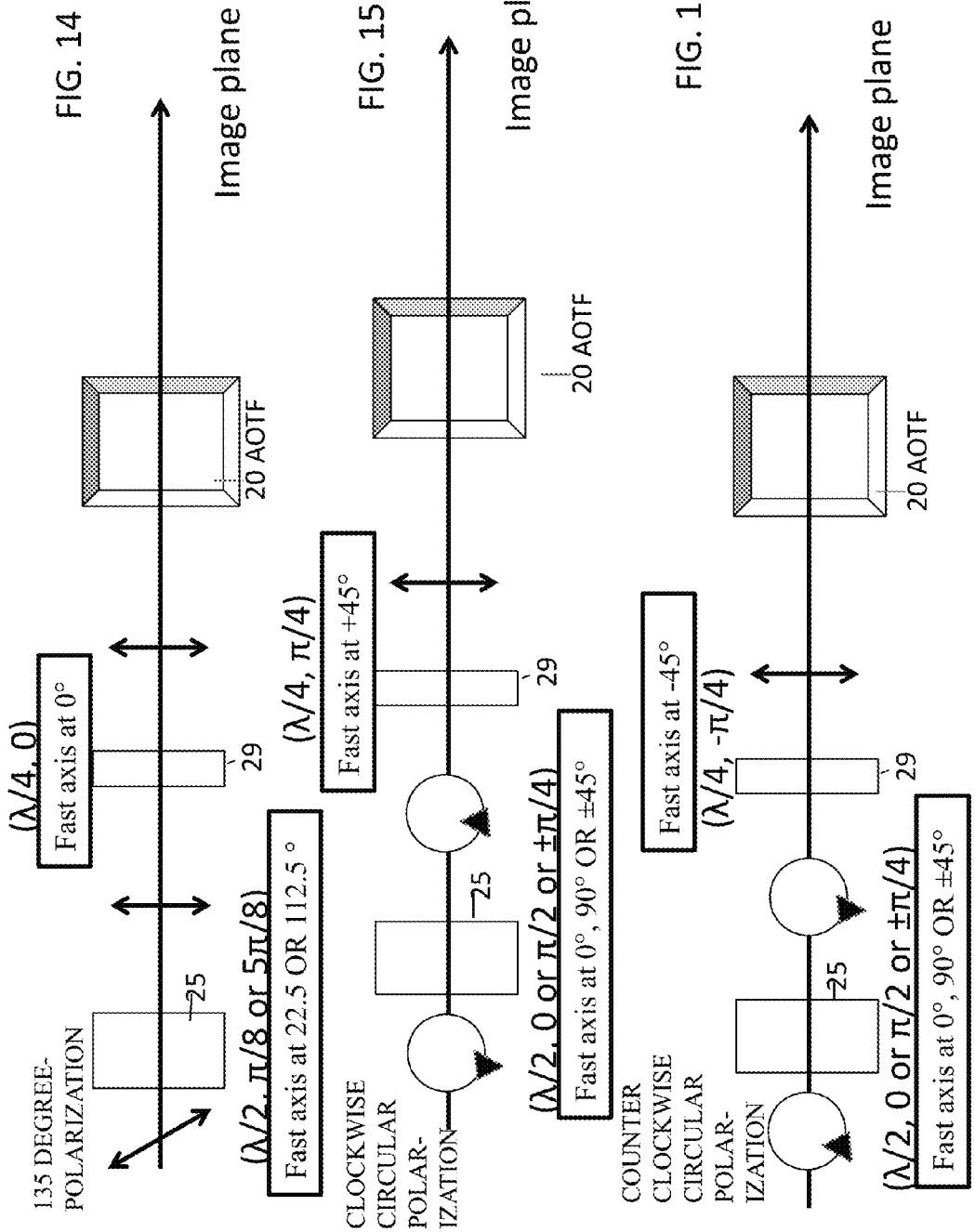

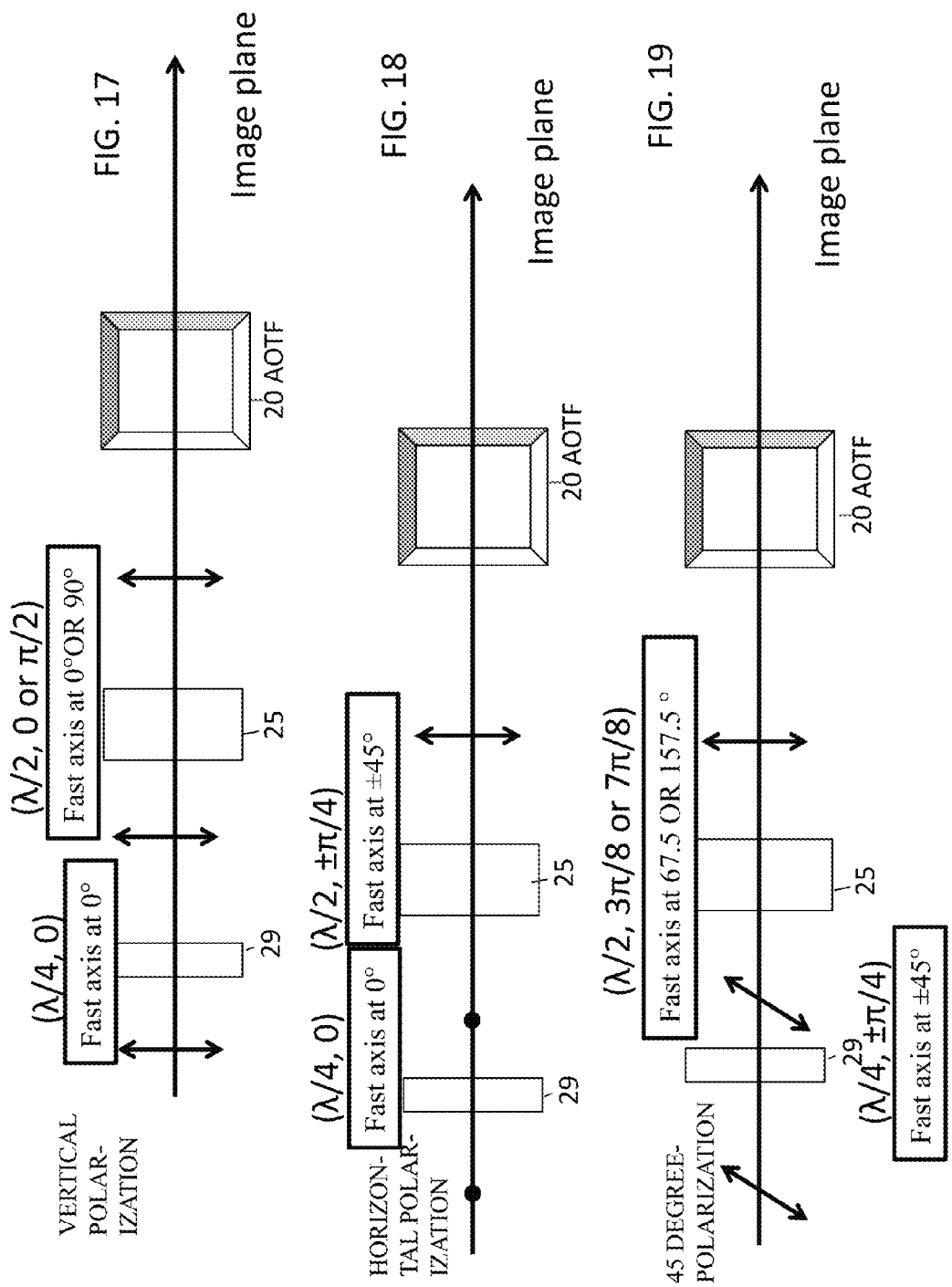

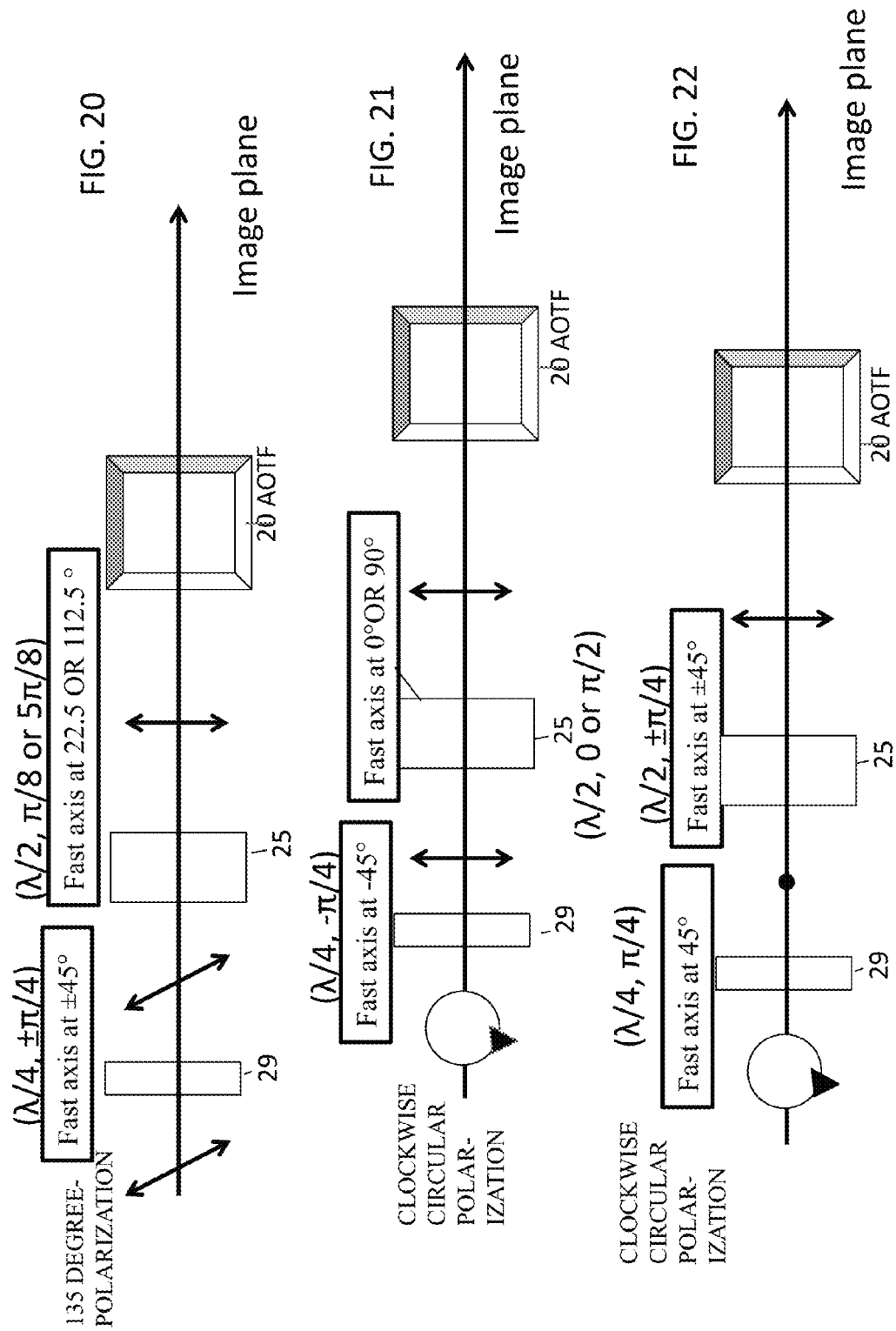

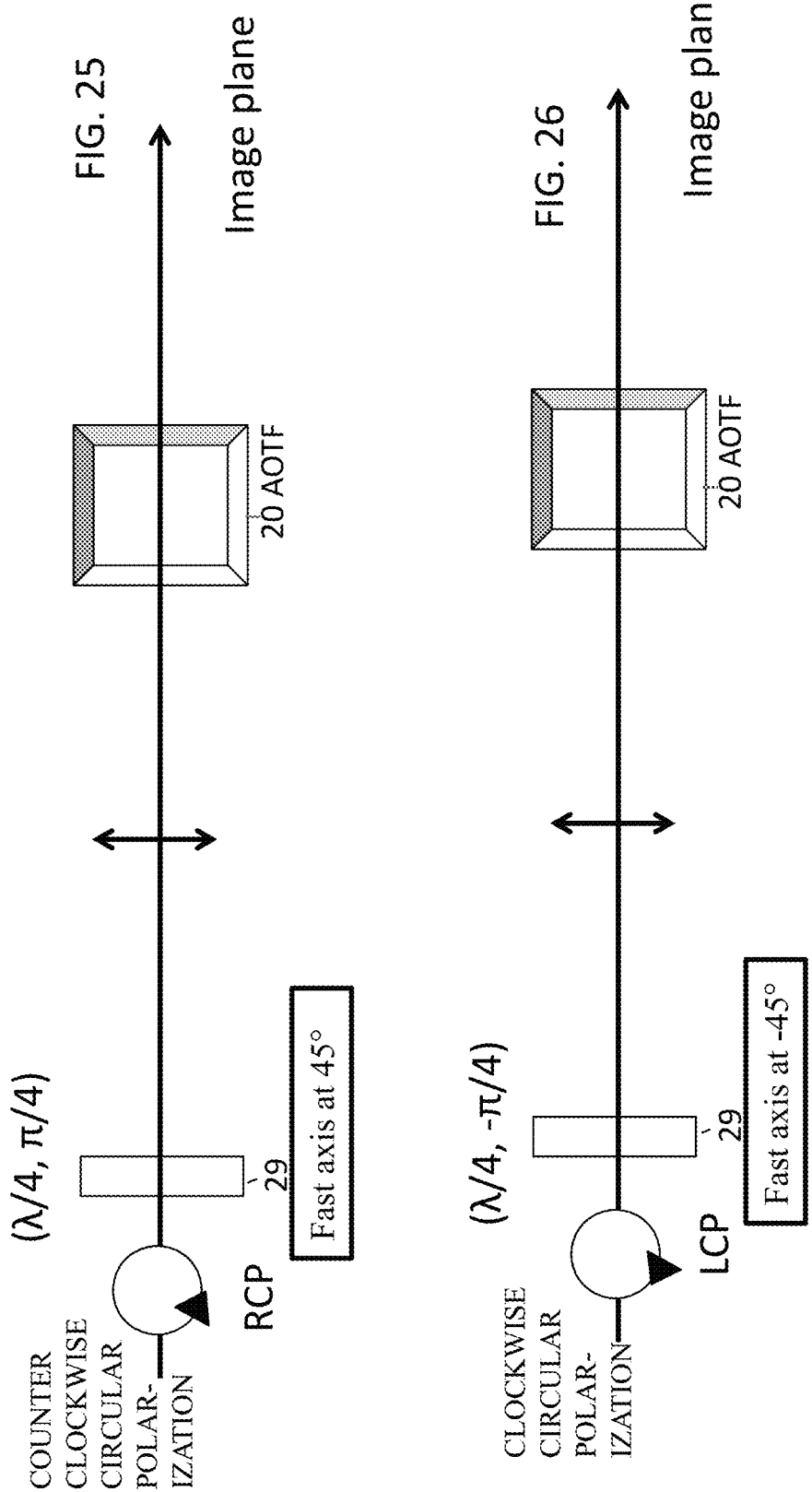

POLARIZATION HYPERSPECTRAL/MULTISPECTRAL IMAGER AND METHOD

STATEMENT OF GOVERNMENT INTEREST

The invention described herein may be manufactured, used, and licensed by or for the United States Government without the payment of royalties.

BACKGROUND OF THE INVENTION

The present invention relates to spectral imaging. In the past, when it was desired to image more than one linear incident polarization using a polarization sensitive spectral filter, such as an acousto-optical tunable filter, other devices in front of the acousto-optical tunable filter were needed to do that. In the past, one could use an electrically tuned liquid crystal variable retarder (LCVR) before the acousto-optical tunable filter, which enabled spectral images with both the vertical and horizontal incident polarizations of incident light. The retarder lets the vertically polarized light pass as it is but when the horizontally polarized light is incident it applies a phase shift or retardance to change the transmitted polarization to vertical as required by the acousto-optical tunable filter.

However, it is desirable to have an imager containing a polarization sensitive spectral filter detect the scene of interest with four different linear incident polarizations of light at each wavelength band contained in the broad spectral range. In some applications it is desirable to also detect all four linear plus two circular polarizations. Another approach is to use two LCVRs in tandem with the acousto-optical tunable filter (AOTF) or liquid crystal tunable filter (LCTF). These devices operate from 400-1800 nm only and the two LCVR approach performance is not consistent.

To describe the polarization behavior completely using measured intensities with vertical, horizontal, 45° and 135° polarizations, i.e., $I_0$, $I_{90}$, $I_{45}$ and $I_{135}$, respectively, the Stokes polarization parameters $S_0=I_0+I_{90}$, $S_1=I_0-I_{90}$ and $S_2=I_{45}-I_{135}$ are used. The parameter $S_0$ corresponds to the total intensity, $S_1$ is the polarization difference between vertical and horizontal polarization and $S_2$ is the polarization difference between 45° and 135° polarization data at each pixel in the corresponding image. When circular polarization is also present, a fourth Stokes parameter is defined as $S_3=I_{RCP}-I_{LCP}$, where $I_{RCP}$ and $I_{LCP}$ are measured intensities of light with right circular polarization (RCP) or counter-clockwise circular polarization and left circular polarization (LCP) or clockwise circular polarization, respectively. The parameters $S_1$ and $S_2$ are used as measures to clearly show influence of the four linear polarizations in the images while $S_3$ shows the influence of the two circular polarizations. Measurement of image intensities with all six polarizations completely determines all four parameters $S_0$, $S_1$, $S_2$ and $S_3$. The Stokes parameters are useful in describing any polarization state of light—unpolarized, partially polarized and completely polarized.

SUMMARY OF THE INVENTION

This invention relates to an optical system and method that can be used to collect spectral images over a broad spectral region, such as for example 400-800 nm, with all four linear polarizations of incident light at each wavelength in the range using an achromatic half waveplate situated before a polarization sensitive spectral filter, i.e., acousto-optic tunable filter (AOTF), within a hyperspectral or multispectral imager.

A preferred embodiment system for obtaining spectral images from light having different polarization orientations comprises:

a polarization sensitive filter; the polarization sensitive filter being configured to receiver light at at least one predetermined polarization orientation;

an achromatic waveplate operatively associated with the polarization sensitive filter; the achromatic waveplate being rotatable to allow entry of light having at least two polarization orientations;

whereby rotation of the achromatic waveplate enables light to enter the polarization sensitive spectral filter at the at least two predetermined polarization orientations.

Optionally, the polarization orientations comprise vertically polarized light, horizontally polarized light, light having a polarization orientation at 45 degrees, and light having a polarization orientation of 135 degrees. Optionally, the achromatic half waveplate is rotatably mounted within a housing. As an alternative, the half waveplate is rotatably turnable to four combinations of positions, the combinations of positions being when the fast axis is zero or 90 degrees to the vertical, the fast axis is ±45 degrees to the vertical, the fast axis is 22.5 or 112.5 (90+22.5)) degrees to the vertical and the fast axis is 67.5 or 157.5 (90+67.6) degrees to the vertical. Optionally, the achromatic waveplate is rotatably driven by a motor.

An alternative preferred embodiment system comprises:
a base;
a wave plate rotatably connected to the base;
a polarization sensitive spectral filter operatively connected to the wave plate; the polarization sensitive filter being configured to receiver light at at least one predetermined polarization orientation;

whereby rotation of the wave plate enables polarized light of different orientations of polarized light to enter the polarization sensitive filter.

Optionally, the polarization sensitive filter is an acousto-optic tunable filter. Optionally, the wave plate is rotatably oriented to receive vertically polarized light, horizontally polarized light, light polarized at 45 degrees, and light polarized at 135°. The wave plate may be rotatable such that orientation of the fast axis is at zero or 90 degrees to the vertical axis for reception of vertically polarized light, orientation of the fast axis is ±45° to the vertical axis for reception of horizontally polarized light, orientation of the fast axis is at 22.5 or 112.5 degrees for incident 135° polarization of light, and orientation is the fast axis is at 67.5 or 157.5 degrees for incident 45 degree polarization of light. Optionally, a quarterwave plate may be used to change circular polarized light to vertically oriented polarized light. Optionally, the spectral range of the wave plate is between 400-800 nm. In addition, or as an alternative, the spectral range may be between 1000-1600 nm. The polarization sensitive filter may, for example, be an acousto-optical tunable filter or, in the alternative, a liquid crystal tunable optical filter.

As a further option, the system may be incorporated in a microscope or telescope.

The present invention is also directed to a method of obtaining spectral images over a broad spectral region with light being inputted having a plurality of polarizations comprising:

providing a polarization sensitive filter; the polarization sensitive filter being configured to receiver light at at least one predetermined polarization orientation;

providing an achromatic half waveplate operatively associated with the polarization sensitive filter; the achromatic waveplate being rotatable.

whereby rotation of the achromatic waveplated enables light to enter the polarization sensitive spectral filter at the at least two predetermined polarization orientations.

The polarization sensitive filter may be an acousto-optic filter or a liquid crystal tunable filter. The at least two predetermined polarization orientations may comprise vertically polarized light, horizontally polarized light, light having a polarization orientation at 45 degrees, light having a polarization orientation of 135 degrees, counter clockwise circularly polarized light and clockwise circularly polarized light. Optionally, the achromatic half waveplate may be rotatably mounted within a housing and/or driven by a motor.

BRIEF DESCRIPTION OF THE DRAWINGS

The foregoing and other objects, features, and advantages of the invention will be apparent from the following more detailed description of the preferred embodiments of the invention, as illustrated in the accompanying drawings, wherein:

FIG. 3 depicts the achromatic half waveplate 25 with its fast axis vertical (or horizontal), such that light with vertical polarization passes to the acousto-optical tunable filter (AOTF) which diffracts it.

FIGS. 7A-7D are schematic illustrations of the operation of an achromatic waveplate for vertical, horizontal, 135° and 45° polarization of incident light with different orientations of fast axis with respect to the vertical axis. In each of the four cases the polarization of light that passes through the half waveplate is vertical.

FIG. 7A is a schematic illustration of the operation of an achromatic waveplate for vertical polarization of incident light with orientation of the fast axis at zero or 90 degrees to the vertical axis.

FIG. 7B is a schematic illustration of the operation of an achromatic waveplate for horizontal polarization of incident light with the orientations of the fast axis at ±45° to the vertical axis.

FIG. 7C is a schematic illustration of the operation of an achromatic waveplate with the fast axis at 22.5 or 112.5 degrees to the vertical axis for incident 135° polarization of light.

FIG. 7D is a schematic illustration of the operation of an achromatic waveplate with the fast axis at 67.5 or 157.5 degrees to the vertical axis for incident 45° polarization of light.

FIG. 11 is a schematic illustration wherein the preferred embodiment system comprises a half wave plate 25 (fast axis at 0 or 90 degrees to vertical) and a quarter wave plate 29 (fast axis at 0 degrees to vertical) for incident vertical polarization of light.

FIG. 12 is a schematic illustration wherein the preferred embodiment system comprises a half wave plate 25 (fast axis at ±45 degrees to vertical) and a quarter wave plate 29 (fast axis at 0 degrees to vertical) for incident horizontal polarization of light.

FIG. 13 is a schematic illustration wherein the preferred embodiment system comprises a half wave plate 25 (fast axis at 67.5 or 157.5 degrees to vertical) and a quarter wave plate 29 (fast axis at 0 degrees to vertical) for incident 45° polarization of light.

FIG. 14 is a schematic illustration wherein the preferred embodiment system comprises a half wave plate 25 (fast axis at 22.5 or 112.5°) and a quarter wave plate 29 (fast axis at 0 degrees to vertical) for incident 135° polarization of light.

FIG. 15 is a schematic illustration wherein the preferred embodiment system comprises a half wave plate 25 (fast axis at 0 or 90 or ±45 degrees to vertical) and a quarter wave plate 29 (fast axis at 45 degrees to vertical) for incident clockwise circular polarization of light.

FIG. 16 is a schematic illustration wherein the preferred embodiment system comprises a half wave plate 25 (fast axis at 0 or 90 or ±45 degrees to vertical) and a quarter wave plate 29 (fast axis at −45 degrees to vertical) for incident counter-clockwise circular polarization of light.

FIG. 17 is a schematic illustration wherein the preferred embodiment system comprises a half wave plate 25 (fast axis at 0° or 90°) and a quarter wave plate 29 (fast axis at 0°) for incident vertical polarization of light.

FIG. 18 is a schematic illustration wherein the preferred embodiment system comprises a half wave plate 25 (fast axis at ±45°) and a quarter wave plate 29 (fast axis at 0°) for incident horizontal polarization of light.

FIG. 19 is a schematic illustration wherein the preferred embodiment system comprises a half wave plate 25 (fast axis at 67.5° or 157.5°) and a quarter wave plate 29 (fast axis at ±45°) for incident 45° polarization of light.

FIG. 20 is a schematic illustration wherein the preferred embodiment system comprises a half wave plate 25 (fast axis at 22.5 or 112.5°) and a quarter wave plate 29 (fast axis at ±45°) for incident 135° polarization of light.

FIG. 21 is a schematic illustration wherein the preferred embodiment system comprises a half wave plate 25 (fast axis at 0° or 90°) and a quarter wave plate 29 (fast axis at −45°) for incident clockwise circular polarization of light.

FIG. 22 is a schematic illustration wherein the preferred embodiment system comprises a half wave plate 25 (fast axis at ±45°) and a quarter wave plate 29 (fast axis at +45°) for incident clockwise circular polarization of light.

FIG. 25 is a schematic illustration wherein the preferred embodiment system comprises a quarter wave plate 29 (fast axis at 45°) for incident counter-clockwise circular polarization of light.

FIG. 26 is a schematic illustration wherein the preferred embodiment system comprises a quarter wave plate 29 (fast axis at −45°) for incident clockwise circular polarization of light.

Figure 9:
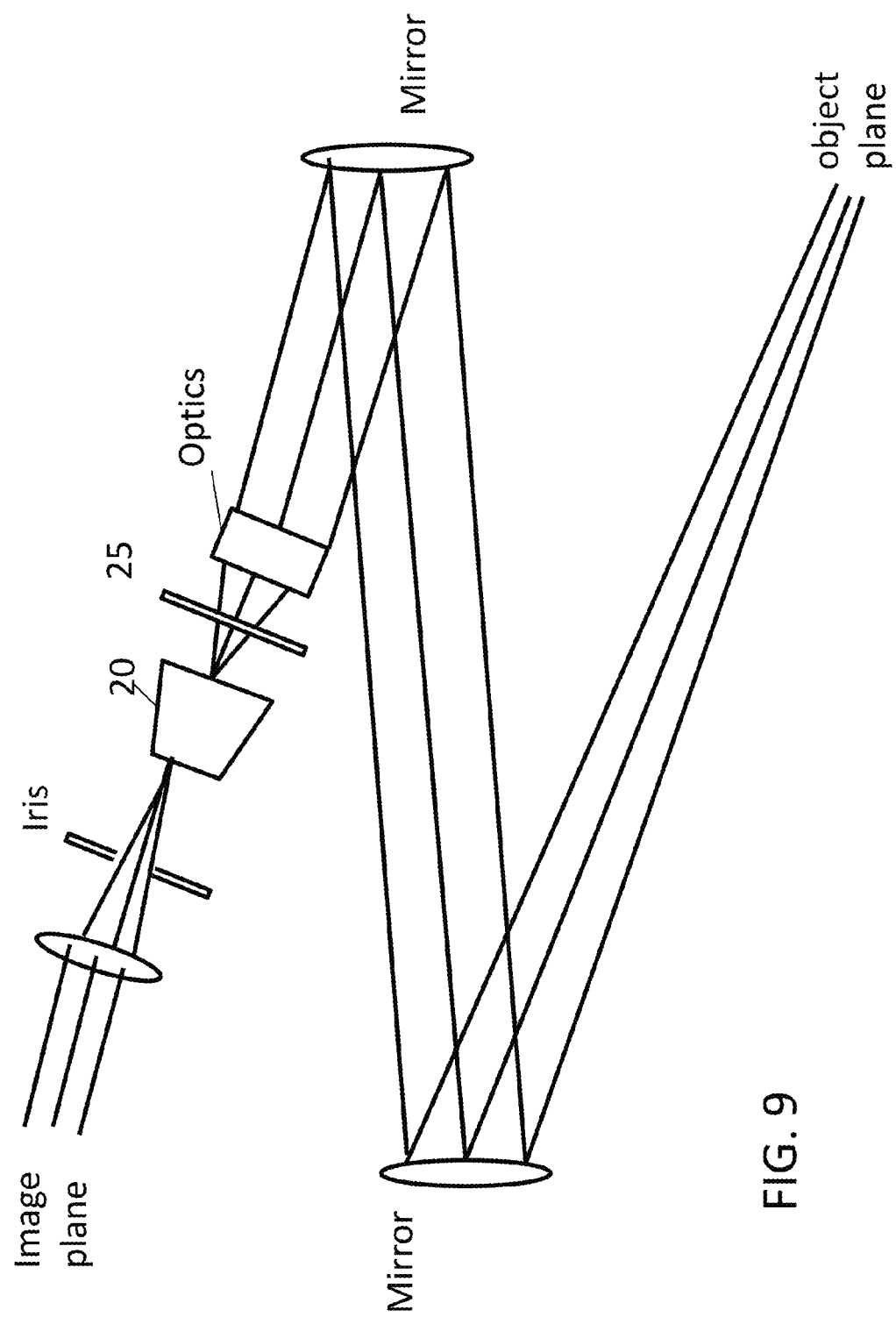
FIG. 9 is a schematic illustration wherein the preferred embodiment system is incorporated in a telescope.
Figure 10:
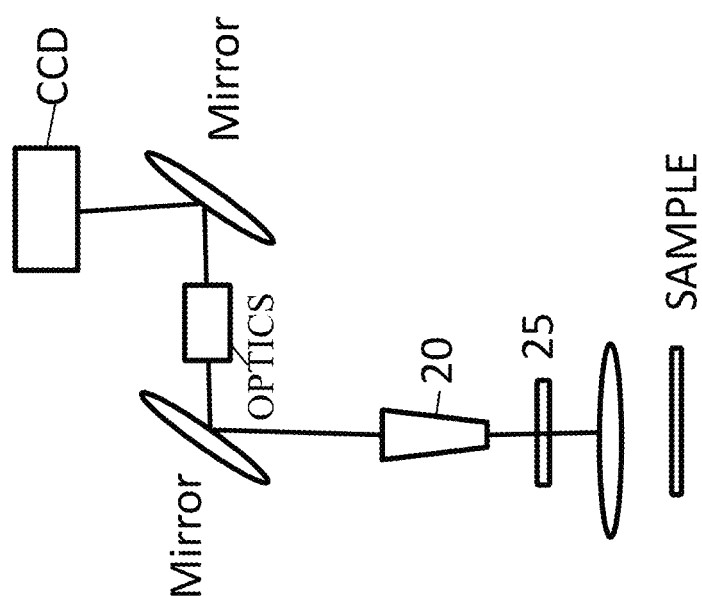
FIG. 10 is a schematic illustration wherein the preferred embodiment system is incorporated in a microscope.

Polarization imaging embodiments shown in FIG. 11-26 can be incorporated in both telescopic and microscopic systems shown in FIGS. 9 and 10.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second lenses, these terms are only used to distinguish one element, or lens from another element or lens. Thus, a first element or lens could be termed a second element or lens without departing from the teachings of the present invention.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention includes a novel method to design and develop a compact field-portable spectropolarimetric imager using an achromatic half waveplate with an acousto-optic tunable filter (AOTF) with suitable optics and camera that can acquire each spectral image within the spectral region of operation with all four incident linear polarizations. The invention provides better target detection and identification by combining both spectral and polarization sensing into one sensor. This method is suitable for imagers operating from the ultraviolet to longwave infrared as both an achromatic half waveplate and an acousto-optical tunable filter can be designed to cover these spectral regions. A preferred method involves insertion of a rotating achromatic half waveplate in front of the acousto-optical tunable filter and the images with different polarization are obtained without any loss in intensity as it is based on applying a phase shift to change the orientation of the incident polarization. Such imagers can be designed for use in telescopes as well as microscopes. Such imagers can be used for both military and civilian applications including medicine, agriculture, food inspection, astronomy, planetary science, quality control in pharmaceutical industry, etc.

Figure 1:
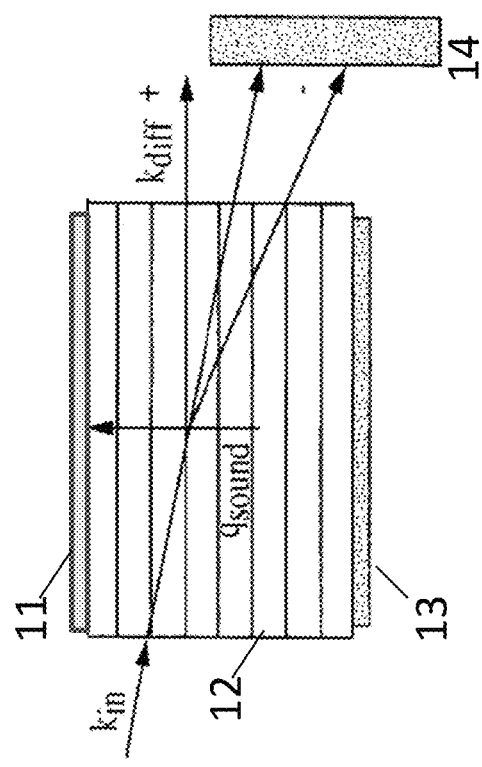
FIG. 1 is a schematic illustration of a spectral tuning operation of a noncollinear acousto-optic tunable filter (AOTF).
Figure 3:
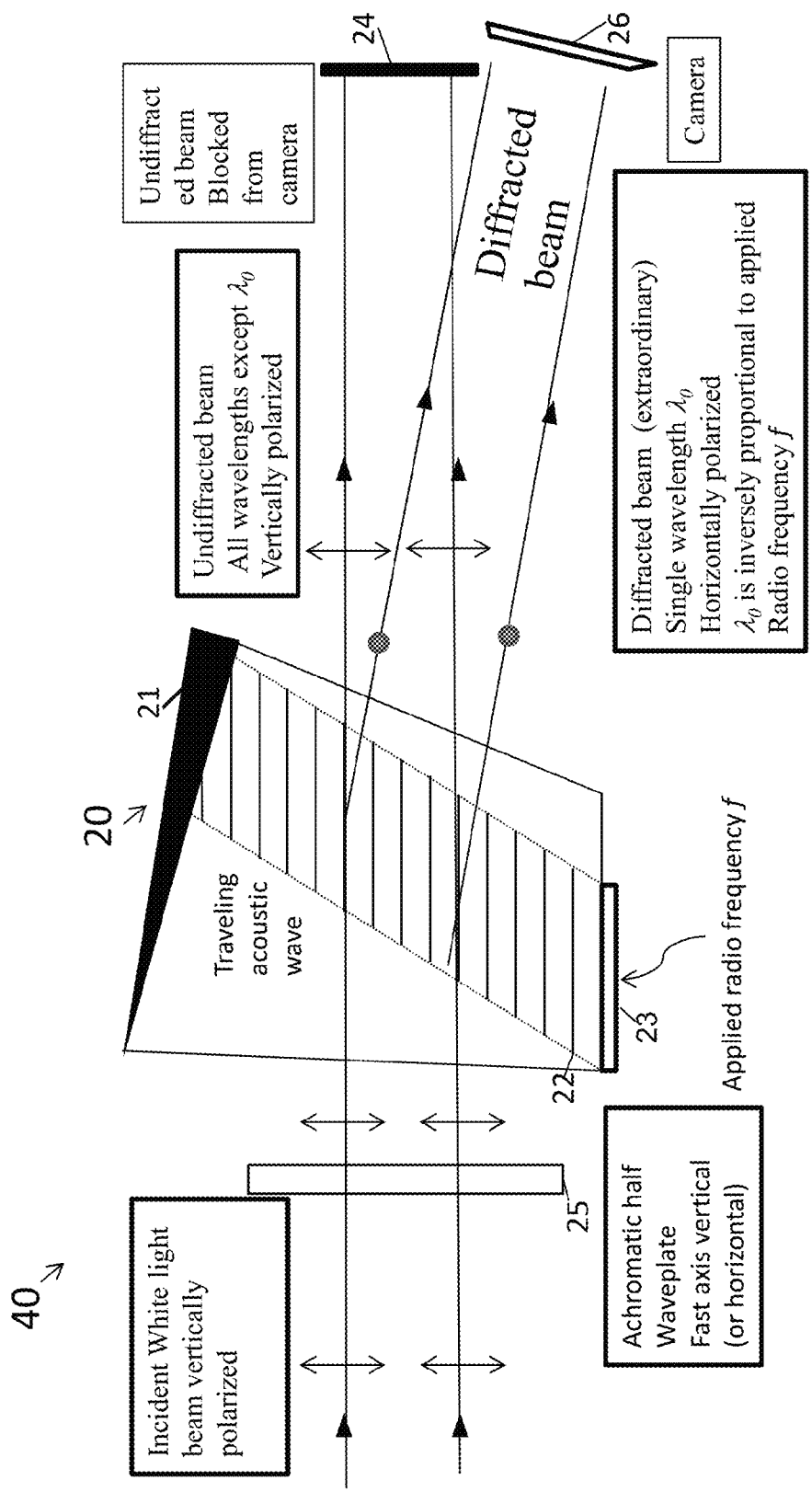
FIG. 3 is a schematic illustration of an achromatic half waveplate 25 positioned before the acousto-optical tunable filter.

A waveplate shifts the phase of polarization components of the light wave. A typical waveplate may be formed from a birefringent crystal, with a carefully chosen orientation and thickness, cut into a plate configuration with the optic axis of the crystal being parallel to the surfaces of the plate. Two axes exist in the plane of the cut: the ordinary axis (with an index of refraction $n_o$) and the extraordinary axis (with index of refraction $n_e$). Light waves normally incident upon the plate have polarization components along the ordinary axis and travel through the crystal with a speed $v_o=c/n_o$, while the polarization components along the extraordinary axis travel with a speed $v_e=c/n_e$, resulting in a phase difference between the two components as they exit the crystal FIG. 1 is a schematic layout of a prior art non-collinear acousto-optic tunable filter. Unlike a traditional grating, prism or LCTF, an acousto-optic tunable filter is polarization sensitive device because the diffracted beams from it are orthogonally polarized. Any other polarization sensitive device could be substituted for the acousto-optical tunable filter 20 (as seen in FIG. 3. For example) without departing from the scope of the invention. The prior art acousto-optical tunable filter shown in FIG. 1 comprises an acoustic absorber 11, a crystal 12, a transducer 13 and a beam stop 14. As shown in FIG. 1, the diffracted beam $k_{diff+}$ is spatially separated from the un-diffracted beam. The diffracted beam emerges at an angle that depends on the wavelength of light relative to the wavelength of the sound. The acoustic waves induce a birefringent phase shift. Due to the anisotropic nature of the acoustical optical interaction involved, the polarization of the diffracted beam is orthogonal to that of the incident beam, and each of these beams travels with a different speed in the crystal. In an acousto-optical spectrometer, as used herein, the acousto-optical tunable filter cell must first be selected for the application having a desired spectral range of operation. As described above, the crystal 12 needs to be cut with a specific orientation and polished. A transducer 13 (such as LiNbO$_3$) is bonded to the crystal 12 using Indium. The traveling acoustic wave is generated in crystal 12 by applying an rf-signal to the transducer. The tuning range for a single transducer is about one octave in acoustic (and optical) frequency; however, an aeousto-optical tunable filter cell can be designed with multiple transducers to cover a wider frequency range of operation. Also, it is desirable to grow many intermediate thin layers of various materials (Sn, Ag, Au, etc.) for proper acoustic matching of the sound wave with the crystal surface over the entire rf-range to ensure that most of the acoustic signal is transmitted through the crystal and does not get reflected back. Once the acoustic signal traverses the cell, it is absorbed by an acoustic absorber on the opposite side of the crystal. The performance of an acousto-optical spectrometer is primarily limited by the quality of materials used. For an interaction medium of an acousto-optical tunable filter, this material must be optically birefringent and transparent in the operating wavelength range of desired use. Also, it must have a low acoustic attenuation in the acoustic frequency range of operation, low depolarization properties so the material must minimize crystalline domains within the material. Also the material must possess a large acousto-optic (AO) figure of merit. The following lists a number of important crystal materials, their spectral ranges of coverage and type of cell that can be fabricated.

TABLE

Materials for Designing Acousto-Optical tunable filter Cells

| Material | Spectral Band (μm) | Type of cell |
| --- | --- | --- |
| Crystal Quartz | 0.25-0.8 | Both |
| LiNbO$_3$ | 0.4-4.5 | Collinear |
| CaMoO$_4$ | 0.4-4.5 | Collinear |
| TeO$_2$ | 0.35-4.5 | Non-collinear |
| Tl$_3$AsSe$_3$ (TAS) | 1.3-17 | Both |
| Hg$_2$Cl$_2$ | 0.35-20 | Non-collinear |
| Hg$_2$Br$_2$ | 0.35-30 | Non-collinear |

The terminology "collinear" means that light and sound propagate in the same direction.

Figure 2:
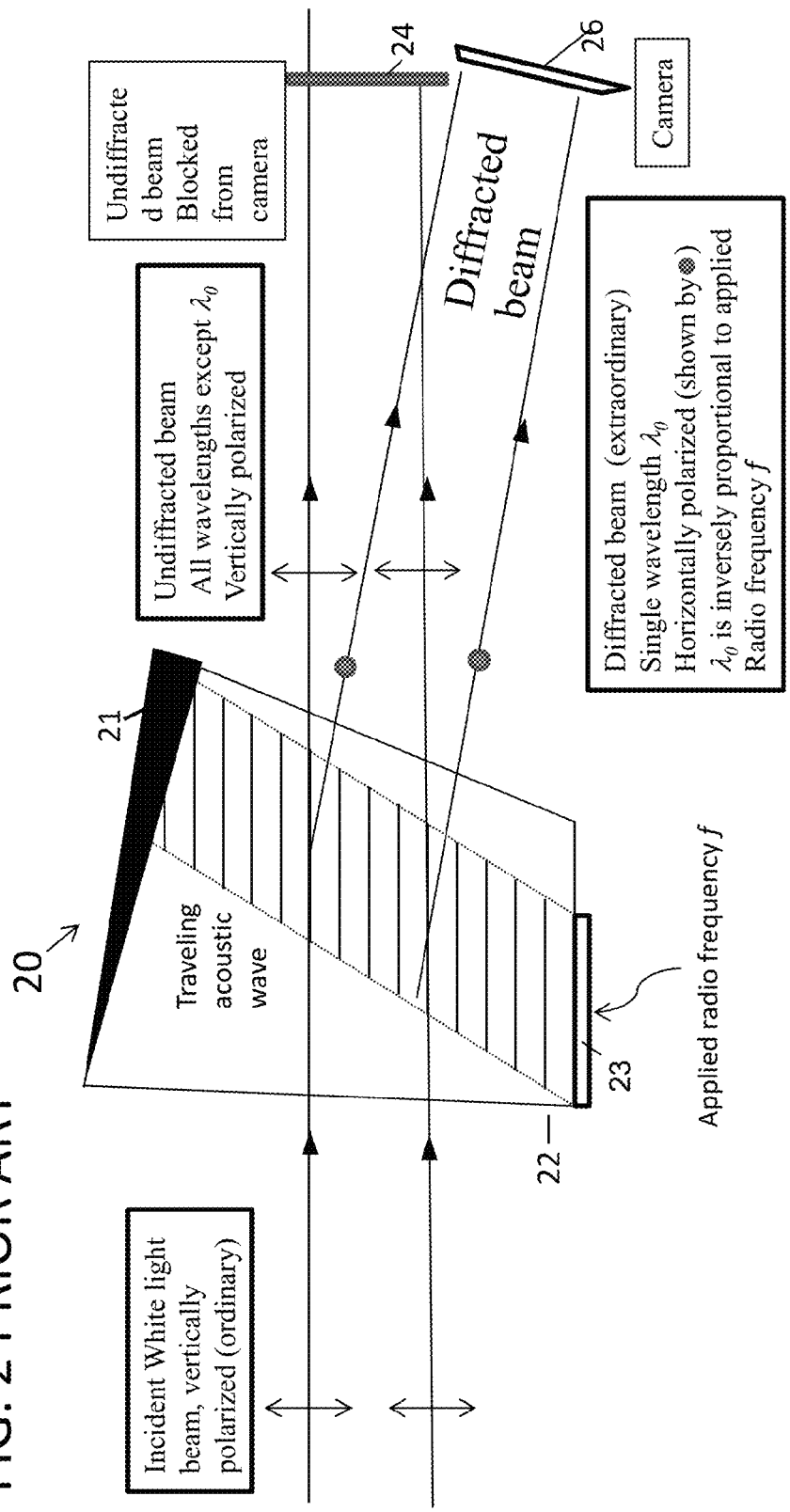
FIG. 2 is a schematic illustration of a prior art acousto-optical tunable filter 20 designed to diffract only vertically polarized light.

FIG. 2 is a schematic illustration of a prior art non-collinear aeousto-optical tunable filter 20 where optical and acoustic waves propagate in different directions. The filter 20 is a solid state device without any moving parts as it is spectrally tuned electronically. The acousto-optical tunable filter 20 comprises an absorber 21, a specially cut crystal prism 22 in a birefringent material that has a piezoelectric transducer 23 bonded to it as shown in FIG. 2. As to the spectral tuning operation of a non-collinear acousto-optic tunable filter 20, incident light needs to be vertically polarized to obtain horizontally polarized diffracted light at a single frequency that is inversely proportional to the applied radio frequency. As will be appreciated by those skilled in the art, it is also possible to use a horizontally polarized incident beam, whereby the diffracted beam will be vertically polarized. In the embodiment shown in FIG. 2, when incident light polarization is horizontal, no diffracted beam is observed. When it is 45° or 135° then the diffracted spectral light has only half of the incident intensity at that wavelength.

As to the operation of acousto-optical tunable filter 20, when a radio frequency (RF) signal is applied to the transducer 23, it produces sound waves with the same frequency as the applied RF which propagate inside the crystal 22 setting up a three dimensional diffraction grating with the period given by the wavelength of acoustic wave in the crystal. At the opposite end of crystal prism from the transducer an acoustic absorber 21 absorbs the sound waves. The acousto-optical tunable filter 20 operates based on a nonlinear interaction between the acoustic and incident light waves such that only one wavelength of light is diffracted at an angle based on the basic design parameters of the device. The diffracted wavelength is inversely proportional to the applied RF. In general, for unpolarized incident light, there are two diffracted waves corresponding to the ordinary and extraordinary polarizations in the birefringent crystal which are orthogonally polarized; i.e., if one is vertically polarized then the other is horizontally polarized. When linearly polarized light is incident on the devices, the diffracted light has linear polarization orthogonal to the incident polarization; i.e., for vertically polarized incident light, the diffracted beam is horizontally polarized. The acousto-optical tunable filer 20 is designed to operate at a single diffracted polarization by incorporating a correction for all wavelengths of operation such that the diffracted spot does not shift with wavelength. Most of the noncollinear acousto-optical tunable filters (AOTFs) used in spectral imaging applications are designed for ordinary incident polarization and extraordinary diffracted polarization. When carrying out spectral imaging with such an acousto-optical tunable filter (AOTF), only one incident polarization is imaged, i.e., vertical. An acousto-optical tunable filter is essentially a real-time programmable filter whose operation can be described as follows. When white light is incident on the filter, it passes only a selected number of narrow bands corresponding to the applied RF-signals. The filter can be used to pass light with either a single wavelength or multiple wavelengths, depending upon the number of applied RF-signals. Either a collinear or a non-collinear geometry can be used in designing an acousto-optical tunable filter cell, based on the symmetry properties of the anisotropic crystal under consideration. In a collinear filter, the incident light is linearly polarized by a polarizer in front of the crystal before it enters the acousto-optical tunable filter cell. As this polarized light passes through the cell, it is diffracted in the same direction by a diffraction grating set up by the collinearly traveling sound wave. In a noncollinear filter the optical and acoustic waves travel in different directions as shown in FIG. 1. Owing to conservation of energy, the frequency of the diffracted light is Doppler shifted, but this frequency shift is insignificant and can be ignored. Based on conservation of momentum, a tuning relationship can be established between the center wavelength of the filter and the applied RF-signal. Note that the undiffracted beam in FIG. 2 (all wavelengths except $\lambda_0$) is vertically polarized and is blocked from the camera by beam stop 24. The hyperspectral imager of FIG. 2, based on an acousto-optical tunable filter can collect images with a single incident polarization, i.e., vertical.

Figure 4:
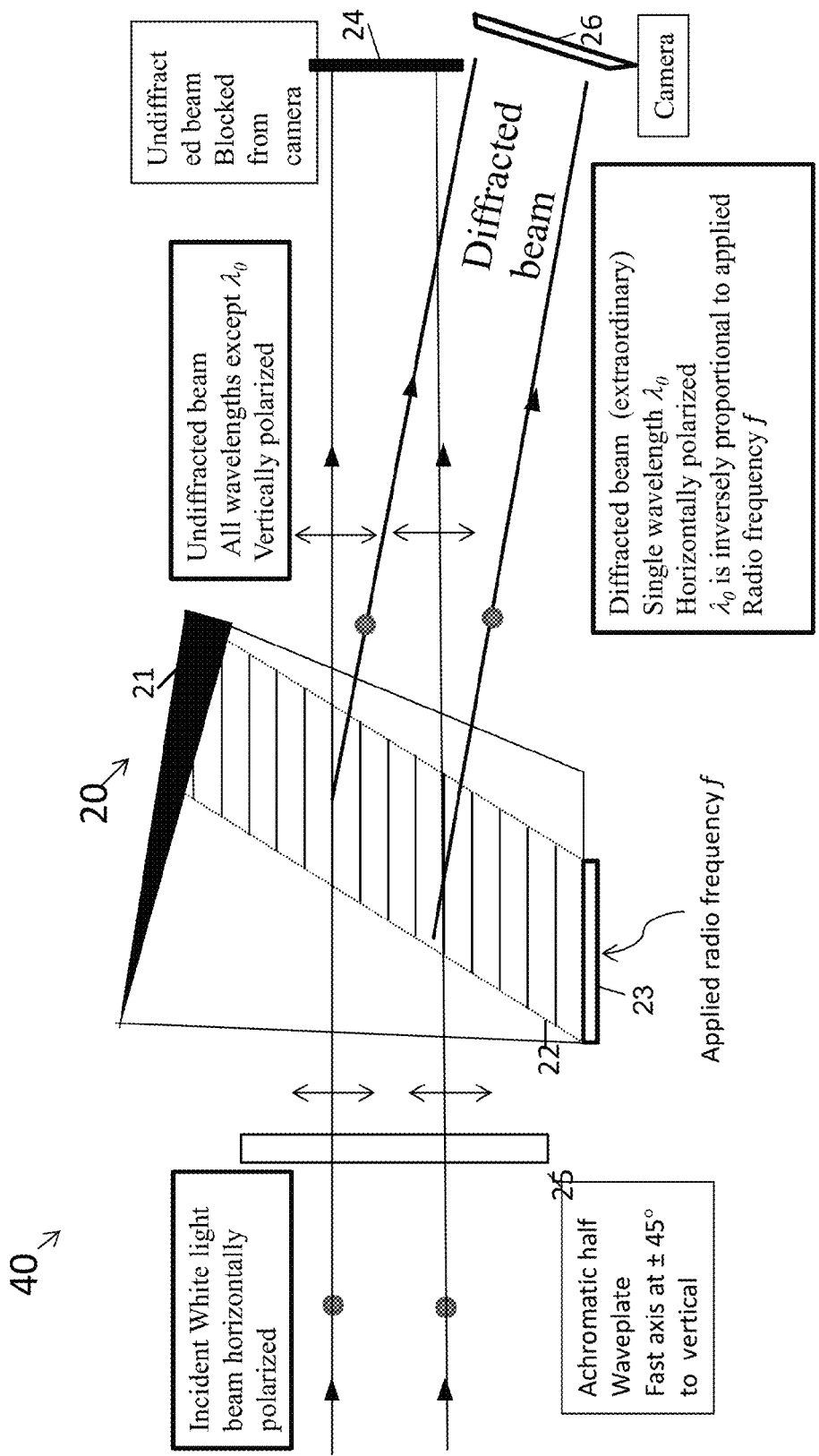
FIG. 4 is a schematic representation of the embodiment of FIG. 3 with the fast axis of the half wave plate 25 at ±45° to vertical.
Figure 5:
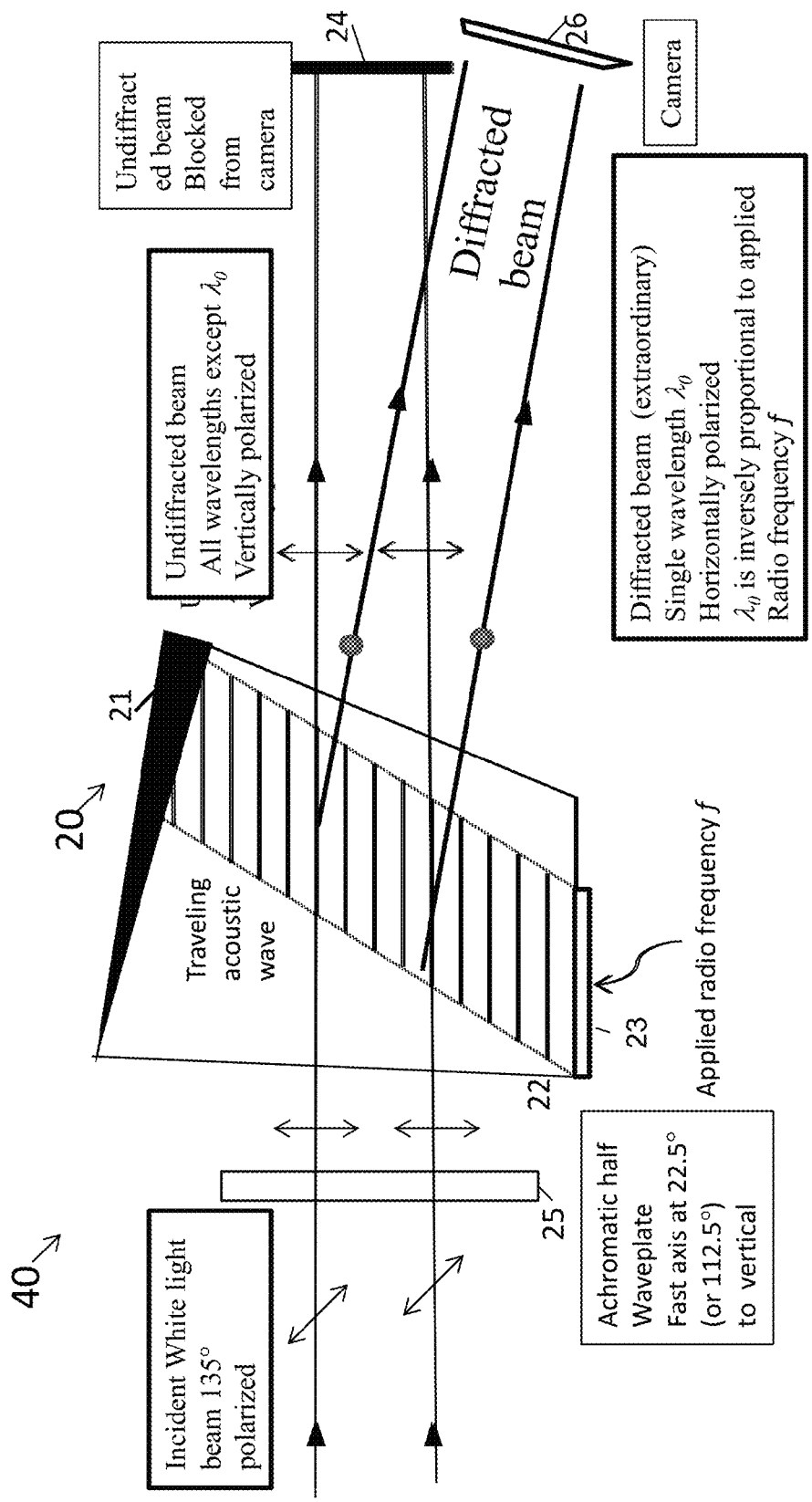
FIG. 5 is a schematic representation of the embodiment of FIG. 3 with the fast axis of the half wave plate 25 at 22.5 or 112.5 degrees to vertical.
Figure 6:
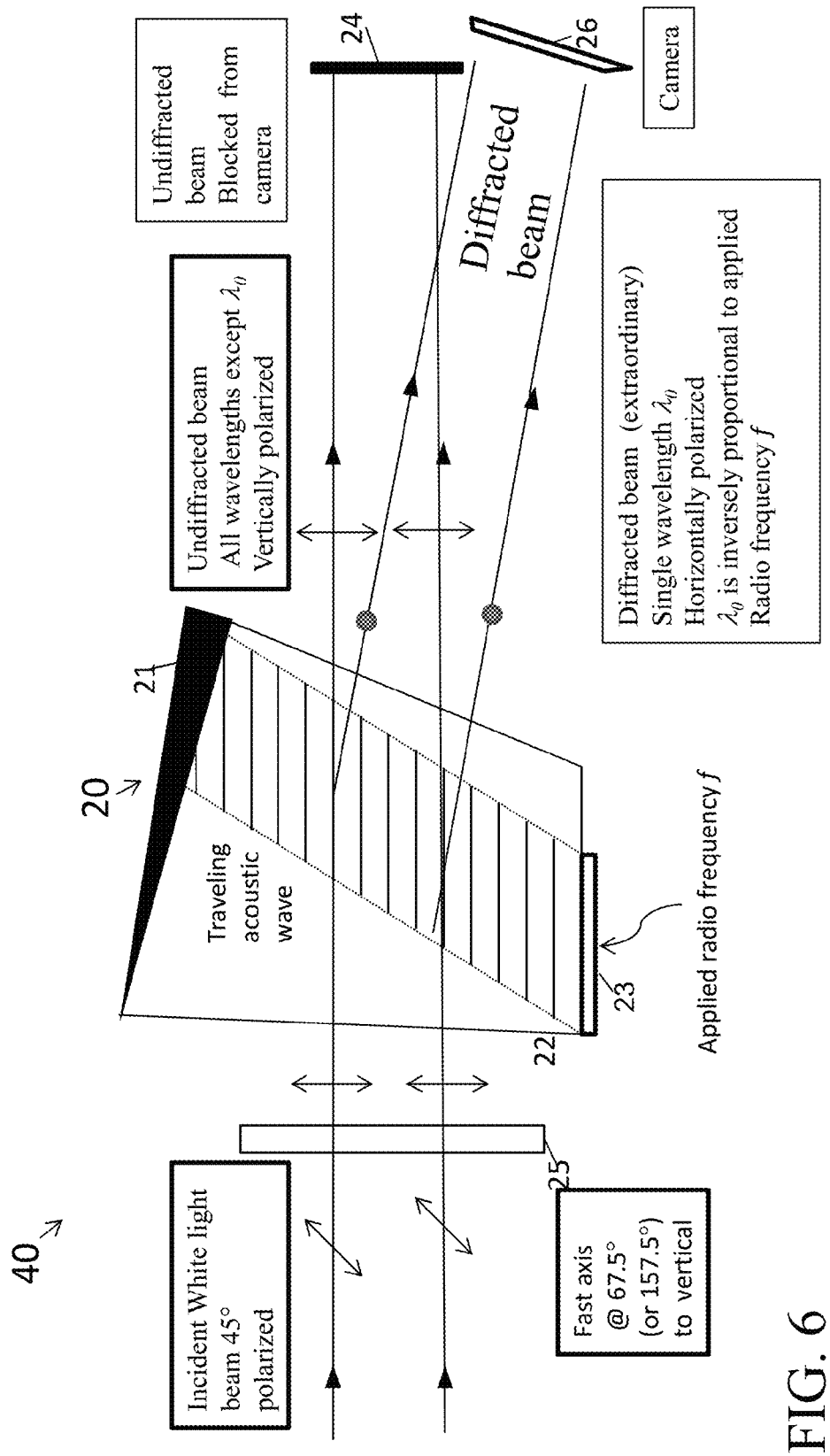
FIG. 6 is a schematic representation of the embodiment of FIG. 3 with the fast axis of the half wave plate 25 at 67.5 or 157.5 degrees to vertical.

A preferred embodiment of the present invention utilizes a single rotating achromatic half waveplate before a polarization sensitive spectral filter, such as for example, an acousto-optical filter, to obtain desired linear polarization required by the spectral filter for each of the four incident linear polarizations of light thus providing an ability to acquire four separate images at each wavelength band each corresponding to one of the four incident linear polarizations. Referring now to FIG. 3, by installing an achromatic half waveplate 25 before the acousto-optical tunable filter and rotating its fast axis to four different positions, appropriate phase retardation can be added to each of the four different incident polarizations; i.e., vertical, horizontal, 45° and 135° such that the transmitted polarization from the waveplate which is also the incident polarization on the acousto-optical tunable filter is always vertical. FIG. 3 depicts the achromatic half waveplate 25 with its fast axis vertical (or horizontal), such that light with vertical polarization passes to the acousto-optical tunable filter (AOTF) which diffracts it. The diffracted beam $\lambda_0$ (extraordinary) is horizontally polarized, and $\lambda_0$ is inversely proportional to applied radio frequency f (applied via transducer 23) and the diffracted beam $\lambda_0$ passes to the camera 26 as shown in FIG. 3. The undiffracted beam (which comprises all wavelengths except for $\lambda_0$ is vertically polarized and encounters beam stop 24. Without rotation, when incident polarization is horizontal or 45° or 135°, no diffracted beam is observed. After appropriate rotation of the rotating achromatic half wave plate 25, spectral images can be obtained with all four linear incident polarizations of light (vertical, horizontal, 45° or 135°), coming from the scene being imaged. Since the waveplate is achromatic over a spectral region, such imaging can be done at each wavelength band within this spectral region. Instead of obtaining a single hyperspectral image cube, the preferred embodiment 40 enables the capture of four image hyperspectral cubes corresponding to each linear polarization (vertical, horizontal, 45° or 135°; i.e., at each one of the four different incident linear polarizations). Implementations of the spectropolarimetric imagers operate from 400-800 nm and 1000-1600 nm. The preferred embodiment shown in FIG. 3 enables the imaging of a scene with four different linear polarizations at a number of wavelengths contained in a specific spectral region. In general, the spectral tuning operation can be carried out by a grating, prism, a noncollinear acousto-optical tunable filter, a liquid crystal tunable filter (LCTF), etc. Grating and prism require rotation of the tuning element while an acousto-optical tunable filter and LCTF are tuned electronically. An acousto-optical tunable filter or liquid crystal tunable filter (LCTF) is a polarization sensitive device and a traditional grating and prism are not polarization sensitive FIG. 4 is a schematic representation of the embodiment of FIG. 3 with the half wave plate 25 fast axis at ±45°. Similar to the embodiment of FIG. 3, addition of an achromatic half waveplate 25 before the acousto-optical tunable filter 20 with its fast axis at ±45° to the vertical lets light with horizontal polarization become vertically polarized which gets diffracted from the acousto-optical tunable filter. When incident polarization is vertical or 45° or 135°, no diffracted beam is observed. The diffracted beam $\lambda_0$ (extraordinary) has a polarization rotated 90° (from vertical to horizontal)), and $\lambda_0$ is inversely proportional to applied radio frequency f (applied via transducer 23) and the diffracted beam $\lambda_0$ passes to the camera 26 as shown in FIG. 3. The undiffracted beam (which comprises all wavelengths except for $\lambda_0$) encounters beam stop 24. Without rotation, when incident polarization is vertical, 45° or 135°, no diffracted beam is observed. It can be appreciated by one of ordinary skill in the art that after appropriate rotation of the rotating achromatic half wave plate 25, spectral images can be obtained with all four linear incident polarizations of light (vertical, horizontal, 45° or 135°), coming from the scene being imaged. Since the waveplate is achromatic over a spectral region, such imaging can be done at each wavelength band within this spectral region. Instead of obtaining a single hyperspectral image cube, the preferred embodiment 40 enables the capture of four image hyperspectral cubes corresponding to each linear polarization (vertical, horizontal, 45° or 135°).

As substantiated by Mueller matrix calculations, a half waveplate inserted before the acousto-optical tunable filter in the path of the incident light can change each of the four incident polarization orientations—vertical, horizontal, 45° and 135° to transmit only vertical polarization if the half waveplate is rotated such that its fast axis makes four selections (a to d) of angles ((a) 0° or 90°, (b) ±45°, (c) 67.5° or 157.5° or (d) 22.5° or 112.5°) with the vertical direction as required by the acousto-optical tunable filter as shown in the FIGS. 3-6. Thus, insertion of an achromatic half waveplate 25 in a rotational stage before an acousto-optical tunable filter (AOTF) will enable one to image the incident scene at each wavelength with each of the four incident polarizations by rotating the half waveplate at the desired angle. The preferred embodiment of the present invention 40 requires only on additional optical element, i.e., an achromatic half waveplate mounted in a rotary stage which can be operated electrically to change the orientation of the fast axis relative to the vertical direction rather quickly.

Commercial achromatic half waveplates in the spectral regions of interest may be utilized in accordance with the principles of the invention. Such half waveplates may be installed in at the input face of an acousto-optical tunable filter imager or before the acousto-optical tunable filter. Results may be achieved by rotation of an achromatic waveplate 25 covering a 400-800 nm spectral region and a second achromatic waveplate 25 covering a 1000-1600 nm region. The extended assembly may optionally include an acousto-optical tunable filter, lens and cameras for each imager. Insertion of an achromatic waveplate provides the capability to image all four incident polarizations at each wavelength band. One advantage of using a rotating half waveplate instead of a rotating linear polarizer is that the intensity of detected light would be not be reduced while it reduces to half for 45° and 135° polarization using the rotating linear polarizer and with it the intensity is zero for the horizontal polarization. While the half waveplate retarder applies a phase shift and changes the polarization orientation of the transmitted light but does not change intensity, so there is no change in intensity of the detected light for each of the four incident polarizations.

By combining the acousto-optical tunable filter 20 with a spectrally tunable retarder to change the polarization of incident light on the imaging system, polarization information from the scene or subject of interest can also be obtained.

Portable Acousto-optical Spectrometers are disclosed in U.S. application Ser. No. 11/208,123, filed Aug. 18, 2005, which issued on May 19, 2009, as U.S. Pat. No. 7,535,617 to Gupta, et al, which is hereby incorporated by reference as though fully rewritten herein. As disclosed in U.S. Pat. No. 7,535,617, the acousto-optical tunable filter (AOTF) is a birefringent crystal having an acoustic transducer bonded to one face. Broad-band light radiation passing through a crystal can be diffracted into specific wavelengths by application of a radio-frequency (RF) driving signal to the crystal transducer. Among the attractive features of acousto-optical tunable filters are their small size, light-weight, computer-controlled operation, large wavelength tuning range, and reasonably high spectral resolution. Additionally, their operation can be made ultra-sensitive by using advanced signal-processing algorithm. The acousto-optical tunable filter device can be used as a part of a spectrometer or other optical instrument.

An example of a spectrometer using acousto optic (AO) crystal cells includes U.S. Pat. No. 5,120,961 (herein incorporated by reference) entitled "High sensitivity acousto-optic tunable filter spectrometer," which teaches of using an acousto-optical tunable filter (AOTF) device in a spectrometer. This spectrometer operates by using continuous wave RF-excitation through the crystal, wherein the spectrometer provides control and modulation of the RF-source.

FIGS. 3-6 represent the four orientations of the fast axis of the waveplate relative to the vertical axis. In FIG. 3 the fast axis is aligned with the vertical or horizontal plane, in FIG. 4 the fast axis is at ±45 degrees, in FIG. 5 the fast axis is at 22.5 or 112.5 degrees and in FIG. 6 the fast axis is at 67.5 or 157.5 degrees to the vertical. The achromatic half waveplate is installed in an electrically rotatable mount such that the fast axis can be rotated to make four polarization orientation selections (a) 0° or 90°, (b) 22.5° or 112.5°, (c) ±45° or (d) 67.5° or 157.5° angle with the vertical axis.

FIGS. 7A-7D are schematic illustrations of the operation of an achromatic waveplate for vertical, horizontal, 135° and 45° polarization of incident light with different orientations of fast axis with vertical axis.

FIG. 7A is a schematic illustration of the operation of an achromatic waveplate for vertical polarization of incident light with orientation of the fast axis at zero (or 90) degrees to the vertical axis.

FIG. 7B is a schematic illustration of the operation of an achromatic waveplate for horizontal polarization of incident light with the orientations of the fast axis at ±45° to the vertical axis.

FIG. 7C is a schematic illustration of the operation of an achromatic waveplate with the fast axis at 22.5 or 112.5 degrees for 135° polarization of incident light.

FIG. 7D is a schematic illustration of the operation of an achromatic wave plate with the fast axis at 67.5° or 157.5° for 45° polarization of incident light.

Figure 8:
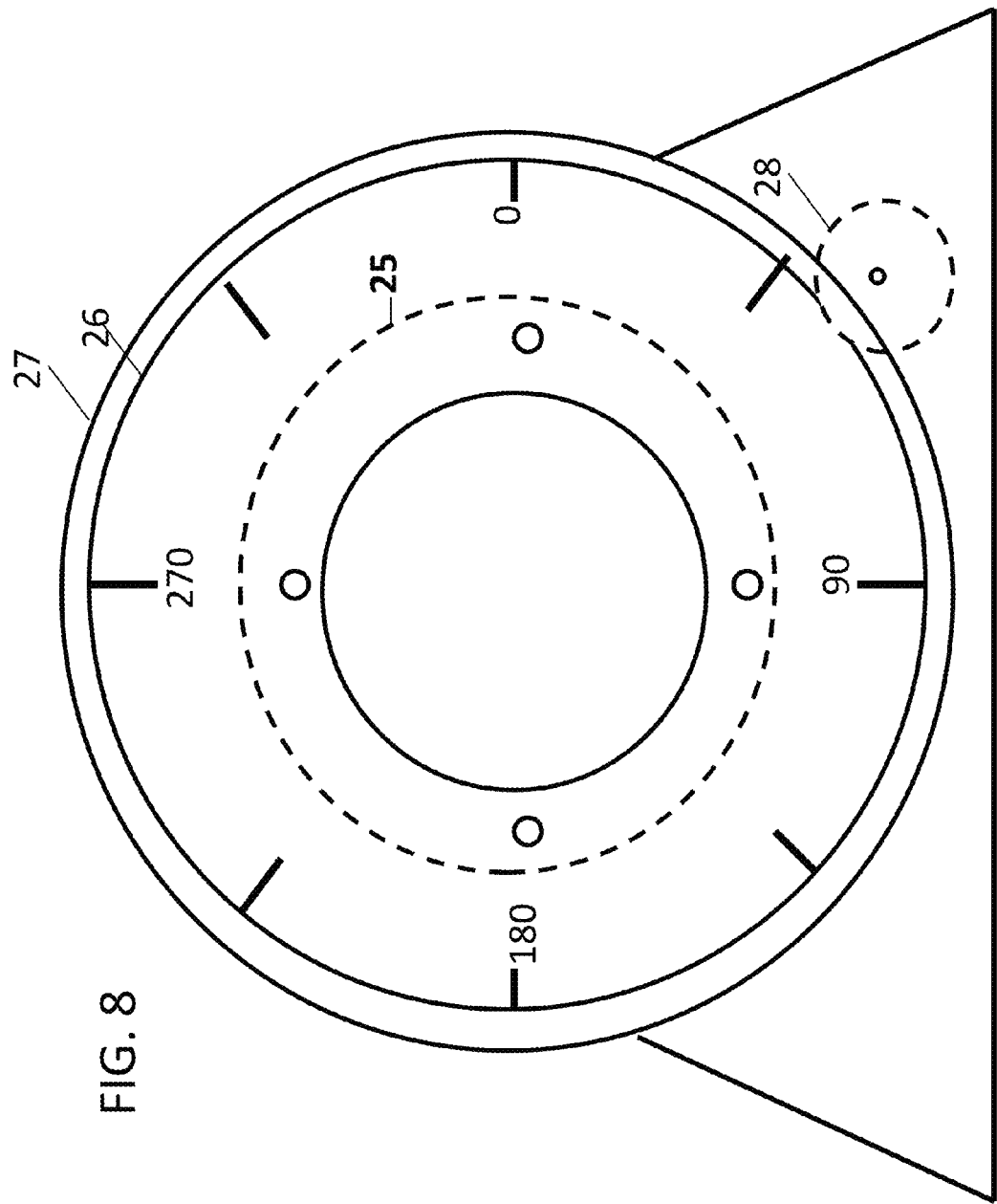
FIG. 8 is a schematic illustration of a rotatable housing for an alternate embodiment of the invention.

FIG. 8 is a schematic illustration of a rotatable housing for an alternate embodiment of the invention. The half wave plate 25 is mounted to a rotatable carrier or support which rotates within a chamber or housing 27. Optionally, the carrier or support 26 may be rotated by a motor 28 in manner apparent to one of ordinary skill in the art.

The advantage of the invention is that only one optical element needs to be inserted in the hyperspectral imager to image all four linear polarizations of incident light at each wavelength band. Such achromatic half waveplate are commercially available from the ultraviolet to the longwave infrared and they can be used with acousto-optical tunable filters (AOTFs) operating in these wavelength regions to develop spectropolarimetric imagers or spectrometers. Other tunable spectral filters that can be used with achromatic half waveplate are liquid crystal tunable filters (LCTF). Any other kind of tunable filter (i.e., polarization sensitive gratings) that has polarization dependence can also be used with a half waveplate 25 either alone or in conjunction with the rotational mechanism of FIG. 8.

The prior art includes using a rotating polarizer in front of the tunable spectral filter and as mentioned earlier it cannot detect all four incident polarizations. Such a rotating polarizer is used with polarization insensitive spectrally tunable devices—filter wheel, gratings, prisms, Fabry-Perot etalons, Michelson interferometer, Sagnac interferometer, Wollaston prism, etc.

Photo-elastic modulators are also used with spectral filters to obtain spectropolarimetric images. Two of these are used and these are large devices and require electronic controllers.

Possible uses for the invention include target detection, medical, astronomy, planetary research, agriculture, microscopy, pharmaceutical quality control, food inspection, etc.

The present invention comprises, inter alia, use of a single achromatic half waveplate that is rotated to four different orientations of its fast axis. Present technology uses a rotating polarizer with a filter wheel, grating or prism or Fabry-Perot etalon, or Michelson interferometer to obtain spectral images with all four incident polarizations. As discussed earlier a rotating polarizer can't be used with an acousto-optical tunable filter (AOTF) or liquid crystal tunable filter (LCTF) to image all four incident polarizations without losing intensity and also not all polarizations can be detected.

Potential Uses

Hyperspectral images with polarization signatures provide better target detection and identification. Spectral features arise due to the material properties of objects as a result of the emission, reflection, and absorption of light, while the polarization features arise from the physical nature of the object surfaces and edges that influence the polarization properties of the reflected, scattered, or emitted light. By combining both polarization and hyperspectral detection capabilities in one single imager, much better object detection and identification can be performed than by using either polarization or hyperspectral capability.

Applications of the preferred embodiment imager which include incorporation in a microscope design as well as a telescope in medicine, astronomy, pharmaceutical quality control, agriculture, etc. The concept of the invention can be used both in imaging and non-imaging spectrometer designs to obtain linear polarization signatures.

FIG. 9 is a schematic illustration wherein the preferred embodiment system is incorporated in a telescope. The half wave plate 25 is operatively associated with the acousto-optical tunable filter 20. FIG. 10 is a schematic illustration wherein the preferred embodiment system is incorporated in a microscope. The half wave plate 25 is operatively associated with the acousto-optical tunable filter 20.

FIG. 11 is a schematic illustration wherein the preferred embodiment system comprises a half wave plate 25 (fast axis at 0 or 90 degrees to vertical) and a quarter wave plate 29 (fast axis at 0 degrees to vertical) for incident vertical polarization of light.

FIG. 12 is a schematic illustration wherein the preferred embodiment system comprises a half wave plate 25 fast axis at ±45 degrees to vertical) and a quarter wave plate 29 (fast axis at 0 degrees to vertical) for incident horizontal polarization of light.

FIG. 13 is a schematic illustration wherein the preferred embodiment system comprises a half wave plate 25 (fast axis at 67.5 or 157.5 degrees to vertical) and a quarter wave plate 29 (fast axis at 0 degrees to vertical) for incident 45° polarization of light.

FIG. 14 is a schematic illustration wherein the preferred embodiment system comprises a half wave plate 25 (fast axis at 22.5 or 112.5 degrees to vertical) and a quarter wave plate 29 (fast axis at 0 degrees to vertical) for incident 135° polarization of light.

FIG. 15 is a schematic illustration wherein the preferred embodiment system comprises a half wave plate 25 (fast axis at 0 or 90 or ±45 degrees to vertical) and a quarter wave plate 29 (fast axis at 45 degrees to vertical) for incident clockwise circular polarization of light.

FIG. 16 is a schematic illustration wherein the preferred embodiment system comprises a half wave plate 25 (fast axis at 0 or 90 or ±45 degrees to vertical) and a quarter wave plate 29 (fast axis at −45 degrees to vertical) for incident counter-clockwise circular polarization of light.

FIG. 17 is a schematic illustration wherein the preferred embodiment system comprises a half wave plate 25 (fast axis at 0° or 90°) and a quarter wave plate 29 (fast axis at 0°) for incident vertical polarization of light.

FIG. 18 is a schematic illustration wherein the preferred embodiment system comprises a half wave plate 25 (fast axis at ±45°) and a quarter wave plate 29 (fast axis at 0°) for incident horizontal polarization of light.

FIG. 19 is a schematic illustration wherein the preferred embodiment system comprises a half wave plate 25 (fast axis at 67.5° or 157.5°) and a quarter wave plate 29 (fast axis at ±45°) for incident 45° polarization of light.

FIG. 20 is a schematic illustration wherein the preferred embodiment system comprises a half wave plate 25 (fast axis at ±45°) and a quarter wave plate 29 (fast axis at 22.5 or 112.5°) for incident 135° polarization of light.

FIG. 21 is a schematic illustration wherein the preferred embodiment system comprises a half wave plate 25 (fast axis at 0° or 90°) and a quarter wave plate 29 (fast axis −45°) for incident clockwise circular polarization of light.

FIG. 22 is a schematic illustration wherein the preferred embodiment system comprises a half wave plate 25 (fast axis at ±45°) and a quarter wave plate 29 (fast axis at +45°) for incident clockwise circular polarization of light.

Figure 23:
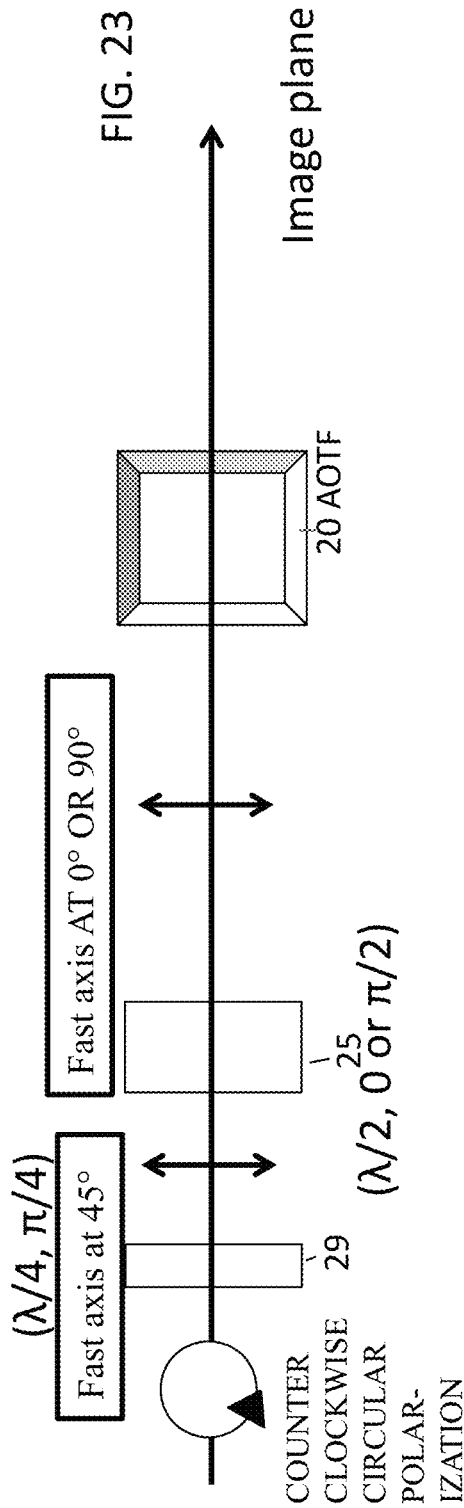
FIG. 23 is a schematic illustration wherein the preferred embodiment system comprises a half wave plate 25 (fast axis at 0° or 90°) and a quarter wave plate 29 (fast axis at 45°) for incident counter-clockwise circular polarization of light.

FIG. 23 is a schematic illustration wherein the preferred embodiment system comprises a half wave plate 25 (fast axis at 0° or 90°) and a quarter wave plate 29 (fast axis at 45°) for incident counter-clockwise circular polarization of light.

Figure 24:
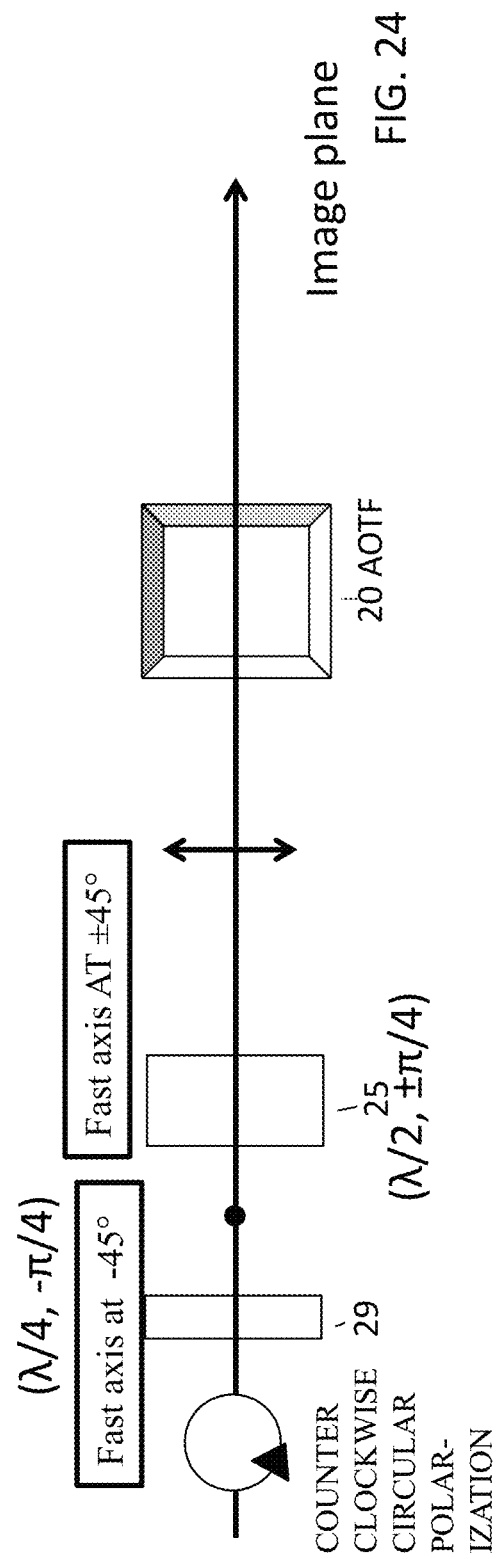
FIG. 24 is a schematic illustration wherein the preferred embodiment system comprises a half wave plate 25 (fast axis at ±45°) and a quarter wave plate 29 (fast axis at −45°) for incident counter-clockwise circular polarization of light.

FIG. 24 is a schematic illustration wherein the preferred embodiment system comprises a half wave plate 25 (fast axis at ±45°) and a quarter wave plate 29 (fast axis at −45°) for incident counter-clockwise circular polarization of light.

FIG. 25 is a schematic illustration wherein the preferred embodiment system comprises a quarter wave plate 29 (fast axis at +45°) for incident counter-clockwise circular polarization of light.

FIG. 26 is a schematic illustration wherein the preferred embodiment system comprises a quarter wave plate 29 (fast axis at −45°) for incident clockwise circular polarization of light.

Application of the preferred embodiment imager can be done from ultraviolet to longwave infrared wavelength ranges with corresponding achromatic half waveplate.

As used herein, the terminology "polarization" means the action or process of affecting radiation such as light so that the vibrations of the wave assume a definite form and the state of the radiation is affected by this process the orientation of the polarization. Polarization orientation is an expression of the orientation of the lines of electric flux in an electromagnetic field (EM field).

Obviously, many modifications and variations of the present invention are possible in light of the above teachings. It is therefore to be understood that, within the scope of the appended claims, the invention many be practiced otherwise than as specifically described.

What is claimed is:

1. A system for obtaining spectral images with polarization signatures from light comprising:
at least one achromatic waveplate; the achromatic waveplate being rotatable to allow entry of light having at least two polarization orientations;
a polarization sensitive filter that changes orientation of polarization of the light; the polarization sensitive filter being operatively associated with the at least one achromatic waveplate and configured to receive light at at least one predetermined polarization orientation and transform it to a second polarization orientation;
whereby rotation of the achromatic waveplate enables light to enter the polarization sensitive filter at the at least two polarization orientations and light is passed through the polarization sensitive filter in order to obtain linear polarization signatures from light to detect surfaces of objects.

2. The system of claim 1 wherein the at least one achromatic waveplate is one or more of a half-waveplate and/or a quarter-waveplate and wherein the at least two predetermined polarization orientations comprise vertically polarized light, horizontally polarized light, light having a polarization orientation at 45 degrees, light having a polarization orientation of 135 degrees, counter-clockwise circularly polarized light and clockwise circularly polarized light, and wherein when linearly polarized light is incident on the polarization sensitive filter it is transformed to a linear polarization that is orthogonal to the incident polarization.

3. The system of claim 1 wherein the at least one achromatic waveplate is rotatably mounted within a housing and is rotatably driven by a motor.

4. A system for obtaining spectral images from polarized light comprising:
a polarization sensitive filter; the polarization sensitive filter being configured to receive light at at least one predetermined polarization orientation;
at least one achromatic waveplate operatively associated with the polarization sensitive filter; the achromatic waveplate comprising a motor-driven half-waveplate having a fast axis and mounted within a housing and rotatably tunable to allow entry of light into the polarization sensitive filter at four pairs of polarization orientation positions, the four pairs of polarization orientation positions being when fast axis is zero or 90 degrees to the vertical, fast axis is ±45 degrees to the vertical, fast axis is 22.5 or 112.5 degrees to the vertical and fast axis is 67.5 or 157.5 degrees to the vertical.

5. A system for obtaining spectral images from polarized light comprising:
  a polarization sensitive filter; the polarization sensitive filter being configured to receive light at at least one predetermined polarization orientation;
  at least one motor-driven achromatic waveplate rotatably mounted within a housing and operatively associated with the polarization sensitive filter; the at least one achromatic waveplate having a fast axis and comprising a quarter-waveplate rotatably turnable to two polarization orientation positions, the two polarization orientation positions being when the fast axis is at −45 degrees to the vertical clockwise circularly polarized light is converted to vertically polarized light and when the fast axis is +45 degrees to the vertical, counter-clockwise circularly polarized light is converted to vertically polarized light;
  whereby rotation of the achromatic waveplate enables light to enter the polarization sensitive filter at the at least two predetermined polarization orientations.

6. A system for obtaining spectral images with polarization signatures comprising:
  a base;
  one or more of a quarter and/or a half-waveplate rotatably connected to the base;
  a polarization sensitive spectral filter operatively connected to the one or more of a quarter and/or a half-waveplate; the polarization sensitive filter being configured to receive light at at least one predetermined polarization orientation and transform it to a second orthogonal polarization orientation;
  whereby rotation of the one or more of a quarter and/or a half-waveplate enables polarized light of one particular orientation to enter the polarization sensitive filter such that only one predetermined polarization orientation enters the polarization sensitive filter at a given point in time and light is passed through the polarization sensitive filter in order to obtain polarization signatures from light to detect surfaces of objects.

7. The system of claim 6 wherein the one or more of a quarter and/or a half-waveplate comprises a half-waveplate that is rotatably oriented to receive vertically polarized light, horizontally polarized light, light polarized at 45 degrees, and light polarized at 135 degrees.

8. The system of claim 6 wherein the one or more of a quarter and/or a half-waveplate comprises a half-waveplate having a fast axis that is rotatable such that orientation of the fast axis is at zero or 90 degrees to the vertical axis for reception of vertically polarized light, orientation of the fast axis is ±45 degrees to the vertical axis for reception of horizontally polarized light, orientation of the fast axis is at 22.5 or 112.5 degrees for incident 135 degrees polarization of incident light, and orientation of the fast axis is at 67.5 or 157.5 degrees for incident 45 degree polarization of light.

9. The system of claim 8 wherein the polarization sensitive filter is an acousto-optical tunable filter.

10. The system of claim 6 wherein the system has a spectral range and wherein the spectral region of the system is in the ultraviolet to longwave infrared spectral wavelength range such that the longest wavelength in the spectral region is at most twice as large as the shortest wavelength; and wherein the one or more of a quarter and/or a half-waveplate has a corresponding spectral range.

11. The system of claim 6 wherein the system is incorporated in one of a telescope or a microscope.

12. A system for obtaining spectral images comprising:
  a base;
  one or more of a quarter and/or a half-waveplate rotatably connected to the base;
  one of an acousto-optic tunable filter or a liquid crystal tunable filter operatively connected to the one or more of quarter and/or half-waveplate; the one of an acousto-optic tunable filter or a liquid crystal tunable filter being configured to receive light at at least one predetermined polarization orientation;
  whereby rotation of the one or more of a quarter and/or half-waveplate enables polarized light of different orientations to enter the one of an acousto-optic tunable filter or a liquid crystal tunable filter.

13. The system of claim 12 wherein the one or more of a quarter and/or half-waveplate comprises a quarter-waveplate and wherein circularly polarized light is converted to vertically polarized light prior to entering the polarization sensitive filter by the quarter-waveplate.

14. The system of claim 12 wherein the half-waveplate has a spectral range between 400-800 nm or 1000-1600 nm.

15. The system of claim 12 wherein the system operates in a nonimaging mode in a spectrometer.

16. A method of obtaining spectral images with polarization signatures from linear polarized light comprising:
  providing an achromatic half-waveplate; the achromatic waveplate being rotatable; and
  providing a polarization sensitive filter operatively associated with the achromatic waveplate; the polarization sensitive filter being configured to receive light at at least one predetermined polarization orientation and transform it to a second orthogonal polarization orientation; the polarization sensitive filter providing linear polarization signatures from light to detect surfaces of objects;
  whereby rotation of the achromatic waveplate enables light to enter the polarization sensitive filter at at least two predetermined polarization orientations which are indicative of the surfaces of objects.

17. The method of claim 16 wherein the achromatic half-waveplate is rotatably mounted within a housing.

18. The method of claim 16 wherein the polarization sensitive filter is an acousto-optic tunable filter and wherein the achromatic half-waveplate has a fast axis and comprises a quarter-waveplate that is configured such that orientation of the fast axis is at ±45 degrees to the vertical axis for reception of circularly polarized light, orientation of the fast axis is +45 degrees to the vertical axis for reception of counter-clockwise circularly polarized light and orientation of the fast axis is at −45 degrees for incident clockwise circularly polarized incident light, such that light exits the quarter-waveplate with a vertical polarization orientation so as to enter the polarization sensitive filter at a predetermined polarization orientation.

19. The method of claim 16 wherein the polarization sensitive filter is an acousto-optic tunable filter and wherein the achromatic half-waveplate has a fast axis and comprises a half-waveplate that is rotatable such that orientation of the fast axis is at zero or 90 degrees to the vertical axis for reception of vertically polarized light, orientation of the fast axis is ±45 degrees to the vertical axis for reception of horizontally polarized light, orientation of the fast axis is at 22.5 or 112.5 degrees for incident 135 degrees polarization of incident light, and orientation is the fast axis is at 67.5 or 157.5 degrees for incident 45 degree polarization of light.

20. A method of obtaining spectral images from linear and circular polarized light comprising:
   providing an achromatic quarter-waveplate and a half-waveplate; the achromatic quarter-waveplate and half-waveplate being rotatable; and
   providing a polarization sensitive filter operatively associated with the achromatic quarter-waveplate and half-waveplate; the polarization sensitive filter being configured to receive light at at least one predetermined polarization orientation;
   whereby rotation of the achromatic quarter-waveplate and half-waveplate enables light to enter the polarization sensitive spectral filter at at least two predetermined polarization orientations.

* * * * *